United States Patent [19]
Akagi et al.

[11] Patent Number: 6,130,797
[45] Date of Patent: Oct. 10, 2000

[54] MAGNETIC RECORDER AND MAGNETOOPTICAL RECORDER

[75] Inventors: Kyo Akagi, Fuchu; Yoshihiro Shiroishi, Hachioji; Reijiro Tsuchiya, Fujisawa; Takehiko Hamaguchi, Omiya; Masuo Umemoto, Tokyo; Mikio Suzuki, Odawara; Takashi Kawabe; Katsuro Watanabe, both of Hitachi; Kiyoshi Matsumoto, Chiba; Atsushi Saito, Hino; Kouichirou Wakabayashi, Kokubunji; Yosuke Hamada, Odawara, all of Japan

[73] Assignee: Hitachi, Ltd., Tokyo, Japan

[21] Appl. No.: 08/913,835

[22] PCT Filed: Mar. 17, 1995

[86] PCT No.: PCT/JP95/00474

§ 371 Date: Sep. 17, 1997

§ 102(e) Date: Sep. 17, 1997

[87] PCT Pub. No.: WO96/29700

PCT Pub. Date: Sep. 26, 1996

[51] Int. Cl.[7] .................................................. G11B 5/596
[52] U.S. Cl. ..................................... 360/77.04; 360/77.08
[58] Field of Search .............................. 360/77.04, 77.08, 360/78.07

[56] References Cited

U.S. PATENT DOCUMENTS

| 4,415,938 | 11/1983 | Heitmann | 360/53 |
| 4,594,622 | 6/1986 | Wallis | 360/77.04 |
| 4,616,276 | 10/1986 | Workman | 360/77.04 |

FOREIGN PATENT DOCUMENTS

| 55-20302 | 7/1975 | Japan . |
| 57-55564 | 4/1982 | Japan . |
| 58-220281 | 12/1983 | Japan . |
| 62-16250 | 1/1987 | Japan . |
| 63-108575 | 5/1988 | Japan . |

*Primary Examiner*—Paul Loomis
*Assistant Examiner*—Dan I. Davidson
*Attorney, Agent, or Firm*—Kenyon & Kenyon

[57] ABSTRACT

Virtual tracks are set so that the rotation center of a magnetic recording medium or the vicinity of the rotation center coincides with the track center of the data information, and positioning servo control is performed. Thus, since it is not necessary to faithfully follow the track center line specified by the servo information that is previously recorded on the magnetic recording medium or magnetooptical recording medium, a vibration is not easily caused in synchronism with the rotation. Therefore, when the rotation center and the pattern center are deviated from each other, since a vibration is not caused in synchronism with the rotation, the magnetic head of the magnetic recorder or the magnetooptical head of the magnetooptical recorder is able to follow tracks with higher precision. Accordingly, the recording density can be increased.

17 Claims, 8 Drawing Sheets

MAGNETIC RECORDER AND MAGNETOOPTICAL RECORDER

TECHNICAL FIELD

The present invention generally relates to magnetic recorders and magnetooptical recorders, and particularly to a magnetic recording medium or magnetooptical recording medium having servo information written on its data area, and to a magnetic recorder or magnetooptical recorder in which high tracking precision can be achieved in cooperation with the medium.

BACKGROUND ART

The so-called "embedded servo" type magnetic disk apparatus employs such a disk as to have servo information written on the data area in order for the information to cause the magnetic head to follow a desired data track. The magnetic disk used in the apparatus of this type has a plurality of servo sectors for servo information and a plurality of data sectors for data alternately arranged on the data area (for example, see JP-B-55-20302).

In the conventional magnetic disk of this type, after servo information is recorded on the magnetic disk, the magnetic head is located with high fidelity at the center of a track based on the servo information, and it records and reproduces the data information on and from the track.

Also, in the magnetooptical disk apparatus, after the servo information is transferred to the magnetooptical disk by photolithography or the like, the magnetooptical head is located with high fidelity at the center of a track based on the servo information, and it records and reproduces the data information.

In the above conventional head-positioning method, however, if the centers of tracks at which the magnetic head or magnetooptical head is located on the basis of the servo information have initial eccentricities with respect to the rotation center of the disk, since the magnetic head or magnetooptical head tries to follow the track center lines with high fidelity and to record or reproduce data information, vibration will occur which synchronizes with the disk rotation while the head is being moved to follow the tracks. This vibration problem will be described with reference to FIG. 1(a).

FIG. 1(a) schematically shows the deviation e between a rotation center 11 of spindle for a magnetic disk 10 and a center of circles (pattern center) 12 which are formed by the center lines of tracks that are specified by the servo information recorded on the magnetic disk 10. As illustrated in FIG. 1(a), the rotation center 11 of spindle on the magnetic disk 10 is assumed to be deviated by e from the center 12 of circles of the servo pattern. Accordingly, the center line 13 of m-th data track and center line 14 of (m+1)-th data track specified by the servo pattern are decentered while the disk is being rotated. For example, the track center 13 is detected according to the servo pattern present within each of the n-th servo sector 15a, (n+1)-th servo sector 15b, (n+2)-th servo sector 15c and (n+3)-th servo sector 15d (the followings are omitted) of the m-th data track, so that a locus which the head 16 is required to trace can be found. In this case, when the movement of the head 16 is observed from the outside of the disk (, or when it is plotted on absolute coordinates), a sinusoidal undulation can be seen as shown in FIG. 1(b) at 19a. The amplitude of this undulation is represented by e. When the movement of the head 16 is observed from the disk 10 (, or when it is plotted on relative coordinates), however, a sinusoidal undulation can also be seen of which the amplitude is 0 if the head can perfectly follow the track center 13 or e/100 if the suppression ratio of the head servo system around the revolution rate is set for about −40 dB in the apparatus, as shown in FIG. 1(c). Therefore, since the head is positioned to be substantially zero in its relative position as shown in FIG. 1(c) at 19c, it vibrates on the absolute coordinates as illustrated in FIG. 1(b) at 19a.

The head system itself moves according to the above vibration, thus excites the mechanical system to vibrate, and finally decreases the positioning precision itself.

Thus, the conventional magnetic apparatus has the problem that when the rotation center of the disk is deviated from the pattern center, a vibration is caused in synchronism with the disk rotation.

Accordingly, it is an object of the invention to provide a magnetic recorder capable of preventing a vibration from being caused in synchronism with the rotation of the magnetic disk when the rotation center of the magnetic disk is deviated from the pattern center.

For the same reasons, the conventional magnetooptical disk recorder also has the problem that when the rotation center of the disk is deviated from the pattern center, a vibration is caused in synchronism with the disk rotation.

Accordingly, it is another object of the invention to provide a magnetooptical recorder capable of preventing a vibration from being caused in synchronism with the rotation of the magnetooptical disk when the rotation center of the magnetooptical disk is deviated from the pattern center.

DISCLOSURE OF INVENTION (1) A magnetic recorder of the invention includes a magnetic recording medium having servo information and data information magnetically recorded, a magnetic head for recording or reproducing those information, means for driving the magnetic recording medium to rotate around a certain point on the medium, means for moving the magnetic head on the surface of the magnetic recording medium on the basis of the servo information, means for determining an eccentricity between the rotation center of the magnetic recording medium and the center of circular servo tracks on the basis of the servo information, means for generating deviation data of tracks from the determined eccentricity, means for storing the deviation data, and means for setting virtual tracks so that the rotation center of the magnetic recording medium or the vicinity of the rotation center coincides with the track center of the data information on the basis of the stored information, and making positioning servo control on the basis of the virtual tracks.

The eccentricity is calculated on the basis of, preferably, the servo information equally and discretely arranged in the rotation direction of the magnetic recording medium.

The eccentricity is also calculated on the basis of, preferably, a special pattern arranged on part of the magnetic recording medium.

The deviation data is formed of, preferably, sector information indicating sector positions, positional error information indicating track center position, and deviation information at the sector positions.

In addition, another magnetic recorder of the invention includes means for generating deviation data of tracks on the basis of the servo information, means for storing the deviation data, and means for setting virtual tracks so that the rotation center of the magnetic recording medium or the vicinity of the rotation center coincides with the track center of the data information, and making positional servo control on the basis of the virtual tracks.

The deviation data is formed of, preferably, sector information indicating sector positions, positional error information indicating track center position, and track information indicating track positions.

The means for storing the deviation data is preferably a volatile semiconductor memory provided within the magnetic recorder.

The means for storing the deviation data is also preferably a nonvolatile semiconductor memory provided within the magnetic recorder.

The deviation data is preferably magnetically stored on the magnetic recording medium.

The center line of each of the virtual tracks coincides with, preferably, a locus of the magnetic head on the magnetic recording medium with a voice coil motor that is used for moving the magnetic head being fixed.

The virtual tracks are set so that the rotation center of the magnetic recording medium or the vicinity of the rotation center coincides with the track center of the data information on the basis of the stored deviation data, followed by positioning servo control, and preferably, when the rotation center of the magnetic recording medium is shifted after the virtual tracks are set, new virtual tracks are set, followed by positioning servo control.

When the rotation center is shifted, preferably the data information is transferred to a continuous free region on the magnetic recording medium, and then new virtual tracks are set.

In addition, when the rotation center is shifted, preferably the data information is transferred to the semiconductor memory provided within the magnetic recorder, new virtual tracks are set, and then the data information is written back.

Also, when the rotation center is shifted, preferably the data information is transferred to the continuous free region on the magnetic recording medium or to the semiconductor memory provided within the magnetic recorder, the eccentricity is measured, and then the data information is read in while feed-forward control is being made on the basis of the calculated deviation data.

Moreover, there is provided another magnetic recorder including a magnetic recording medium having servo information and data information magnetically recorded, a magnetic head for recording or reproducing those information, means for driving the magnetic recording medium to rotate around a certain point on the medium, means for moving the magnetic head on the surface of the magnetic recording medium according to the servo information, means for determining an eccentricity between the rotation center of the magnetic recording medium and the center of circular servo tracks on the basis of the servo information, means for generating deviation data of tracks from the determined eccentricity, means for storing the deviation data, and means for making positioning servo control relative to an initial position of the magnetic head with the head fixed at the initial position without offset addition (correction), which initial position is treated as the stored information.

The initial position is preferably set in association with a particular position on the surface of the magnetic recording medium.

The initial position is also preferably set in association with all necessary regions on the surface of the magnetic recording medium.

(2) A magnetooptical recorder of the invention includes a magnetooptical recording medium having servo information and data information recorded in magnetooptical way, a magnetooptical head for recording or reproducing those information, means for driving the magnetooptical recording medium to rotate around a certain point on the medium, means for moving the magnetooptical head on the surface of the magnetooptical recording medium on the basis of the servo information, means for determining on the basis of the servo information an eccentricity that occurs in association with the rotation of the magnetooptical recording medium, means for generating deviation data of tracks from the determined eccentricity, means for storing the generated deviation data, and means for setting virtual tracks so that the rotation center of the magnetooptical recording medium or the vicinity of the rotation center coincides with the track center of the data information on the basis of the stored deviation data, and making positioning servo control.

In the magnetooptical recorder, the virtual tracks are set so that the rotation center of the magnetooptical recording medium or the vicinity of the rotation center coincides with the track center of the data information on the basis of the stored deviation data, followed by the positioning servo control, and when the rotation center of the magnetooptical recording medium is shifted after the virtual tracks are set, new virtual tracks are set, and the positioning servo control is performed.

In the magnetic recording medium of the invention, since the head need not faithfully follow the track center line specified by the servo information recorded on the magnetic recording medium or magnetooptical recording medium, a vibration synchronized with the rotation is not easily caused.

Therefore, when the rotation center and the pattern center are deviated from each other, since a vibration synchronized with the rotation of the disk is not caused, the magnetic head or magnetooptical head can be positioned with extremely high precision.

BEST MODE FOR CARRYING OUT THE INVENTION

Embodiments of the invention will be described with reference to the accompanying drawings.

[Embodiment 1]

FIGS. 1, 2, 3, 4 and 5 show diagrams for the embodiment 1 of the magnetic recorder according to the invention. As illustrated in FIG. 1(a), the rotation center 11 of spindle on the magnetic disk 10 is assumed to be separated by the deviation e from the center 12 of circles of the servo pattern recorded on the magnetic disk.

Figure 1A:
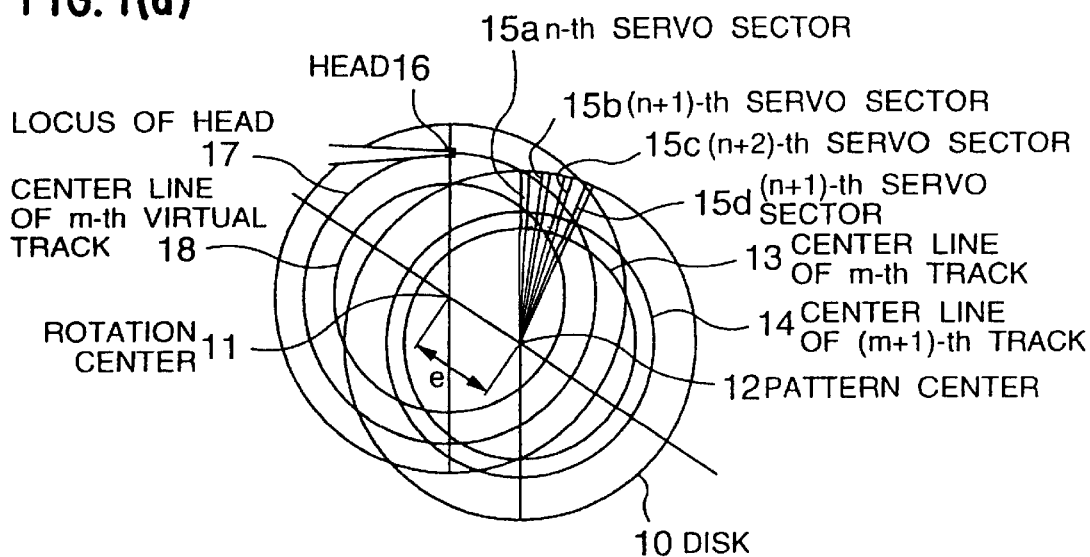
FIG. 1(a) is a plan view of main part showing the idea of virtual tracks in embodiment 1 of a magnetic recording medium according to the invention.
Figure 1B:
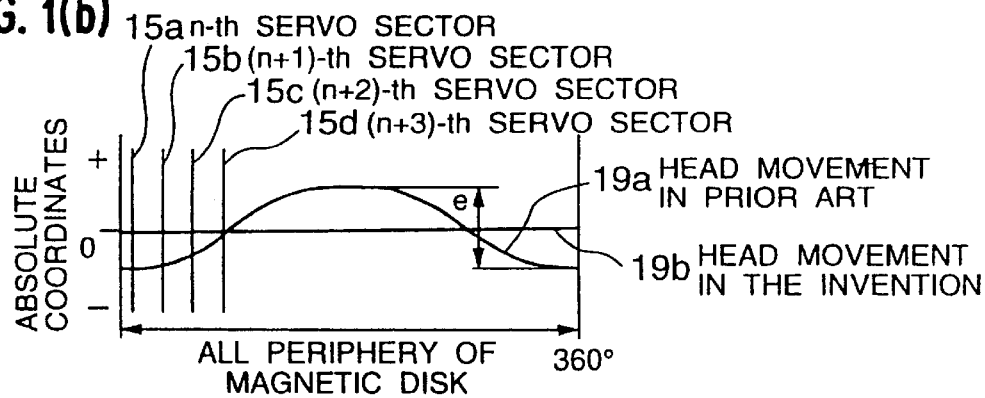
FIG. 1(b) is a graph showing the locus of the head when the movement of the head in the radius direction of the disk is observed from the outside of the recorder.

The center line 13 of the m-th data track and center line 14 of the (m+1)-th data track of the servo pattern are thus eccentric while the disk is rotating. For example, the track center 13 is detected by the servo pattern within each of the n-th servo sector 15a, (n+1)-th servo sector 15b, (n+2)-th servo sector 15c and (n+3)-th servo sector 15d (the followings are omitted) of m-th data track, so that a locus to be traced by the head 16 can be found. Here, if the position of the head 16 is fixed on the absolute coordinates by maintaining the current in a voice coil motor for driving the head 16 to be constant, the amplitude of the head movement is 0 on the absolute coordinates as shown in FIG. 1(b). In FIG. 1(a), a circle concentric with the rotation center of the disk is a locus 17 of the head. In this invention, this locus is treated as m-th virtual data track.

Figure 1C:
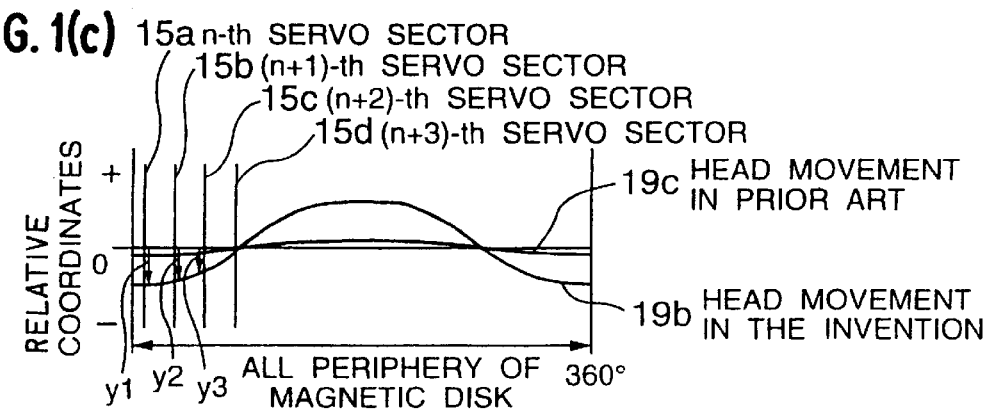
FIG. 1(c) is a graph showing the locus of the head when the movement of the head in the radius direction of the disk is observed on the disk surface.

In this case, as shown in FIG. 1(c), the head traces a sinusoidal locus relative to the center of the m-th track. More specifically, deviations y1, y2, y3 and y4 are produced at the n-th servo sector, (n+1)-th servo sector, (n+2)-th servo sector and (n+3)-th servo sector, respectively. According to the invention, the deviation at each servo sector is previously measured and stored. When data is recorded or reproduced, the locus 17 of the head, or the m-th virtual data track in this invention can be derived from the information of each servo sector and the deviation data.

Figure 2A:
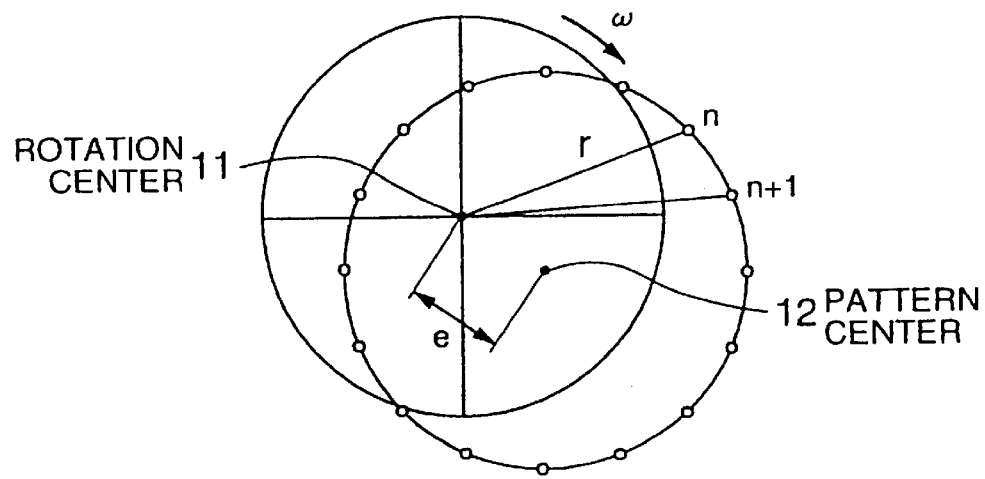
FIG. 2(a) is a diagram to which reference is made in explaining the principle of the measurement of the deviation between the rotation center of the disk and the pattern center in the embodiment 1 of the magnetic recorder according to the invention.

Referring to FIG. 2(a), if the rotation center 11 of the disk is deviated by e from the pattern center 12, the period T(n) between the n-th sector and the (n+1)-th sector can be expressed by $$T(n) = \lambda / (\omega \sqrt{(r^{\wedge}2 + e^{\wedge}2 + 2r(n)e\cos(\lambda n / r(n)))})$$

from the figure, where $\lambda$ is the wavelength between sectors on the disk, $\omega$ is the angular velocity of rotation of the disk, and r(n) is the radius from the rotation center. The radius r(n) can be found from this equation and by measuring the period between sectors.

Figure 2B:
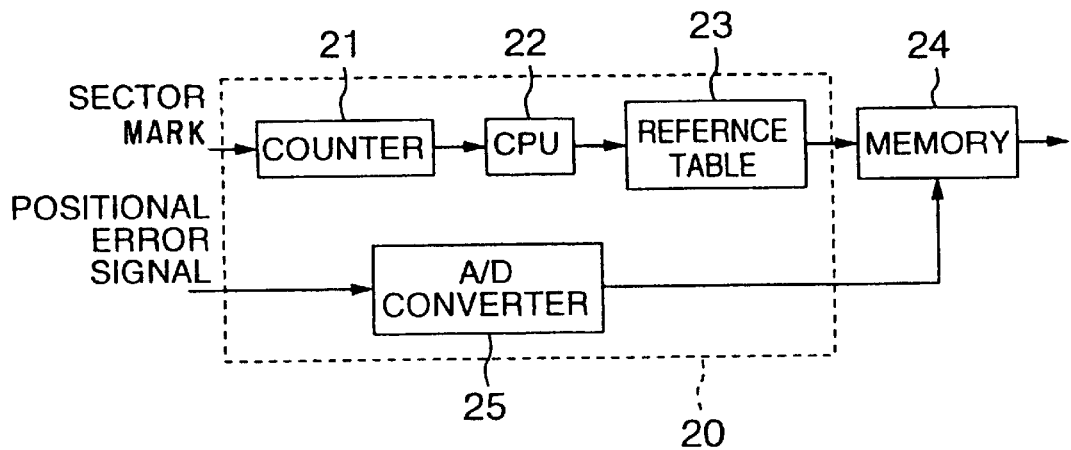
FIG. 2(b) is a circuit block diagram for the measurement of the deviation.

FIG. 2(b) is a circuit block diagram for the above processing. The period between sector marks is measured by a counter 21, the above equation is computed by a CPU 22, and then the results from the computer are fed through a reference table 23 to a memory 24 as information for each sector. Here, on the reference table 23, there are stored the radius r(n) and the track number of each track so that they are associated with each other when the pattern center and the rotation center are assumed to be coincident.

Figure 3:
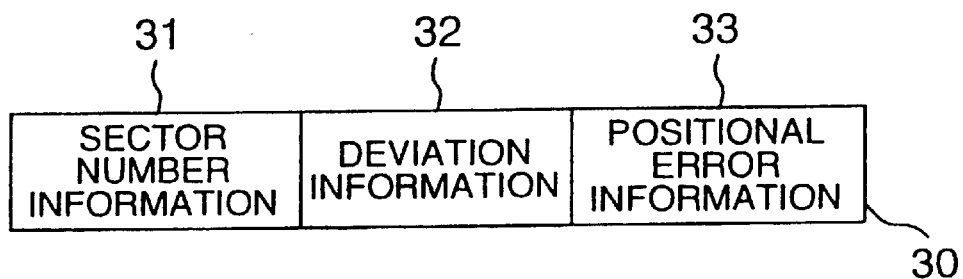
FIG. 3 shows data format of servo information in the embodiment 1 of the magnetic recording medium according to the invention.

FIG. 3 shows the data format of servo information to be stored in the memory 24 illustrated in FIG. 2(b). The servo information 30 is formed of a sector number 31 of 9 bits, a track number 32 of 16 bits and positional error information 33 of 4 bits. Here, the positional error information 33 within the range of the track width is obtained through the processes in which the positional error signal used in the prior art is 2^4 divided and converted into a digital form. This result is produced from the A/D converter 25 shown in FIG. 2(b).

Figure 4:
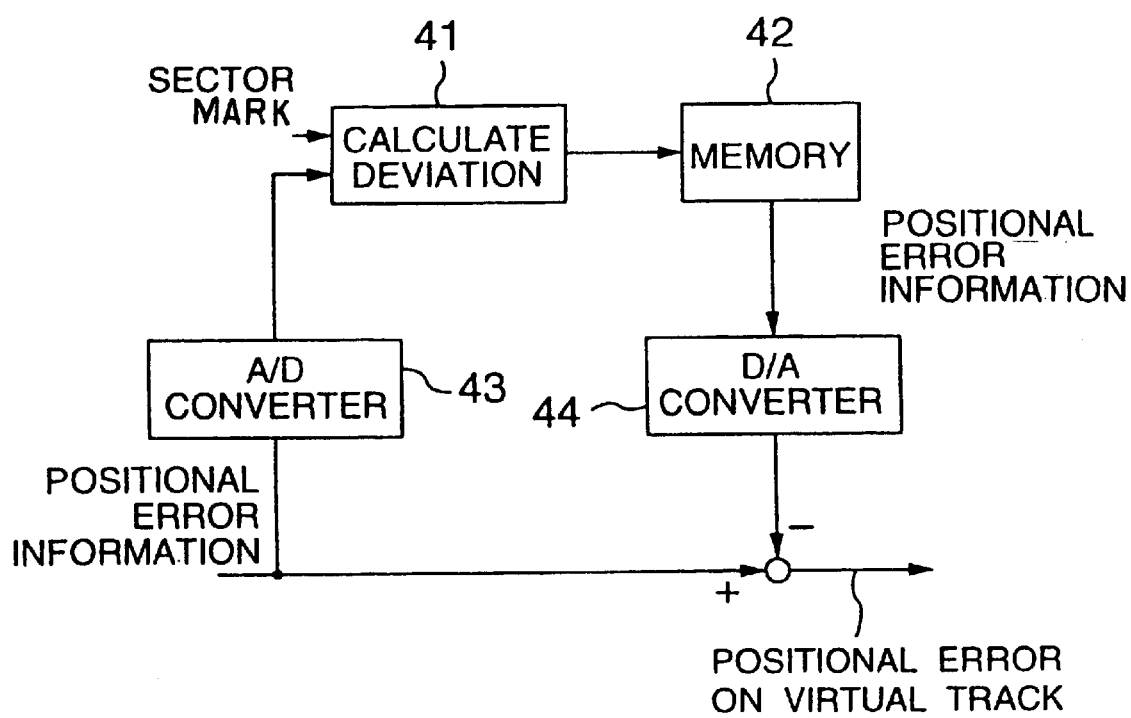
FIG. 4 is a circuit block diagram for generating virtual tracks and producing a positional error signal for tracking in the embodiment 1 of the magnetic recorder according to the invention.

FIG. 4 is a circuit block diagram for generating virtual tracks and producing a positional error signal for tracking in the embodiment 1 of the magnetic recorder according to the invention. Fundamentally, the deviation data stored in the memory 42, after the sector mark and analog positional information acquired from each servo pattern are processed by the eccentricity measurement 20 in FIG. 2(b), is compared with the positional error information produced by the head that traces the virtual track, and feedback control is performed so that the difference can be reduced to 0. The positional error information on the virtual track is the sum of the analog deviation in the radius direction into which the difference between the track number of the virtual track and that of a certain track at which the head is desired to be located is converted from the digital value, and the analog positional information acquired from the servo pattern.

Figure 5:
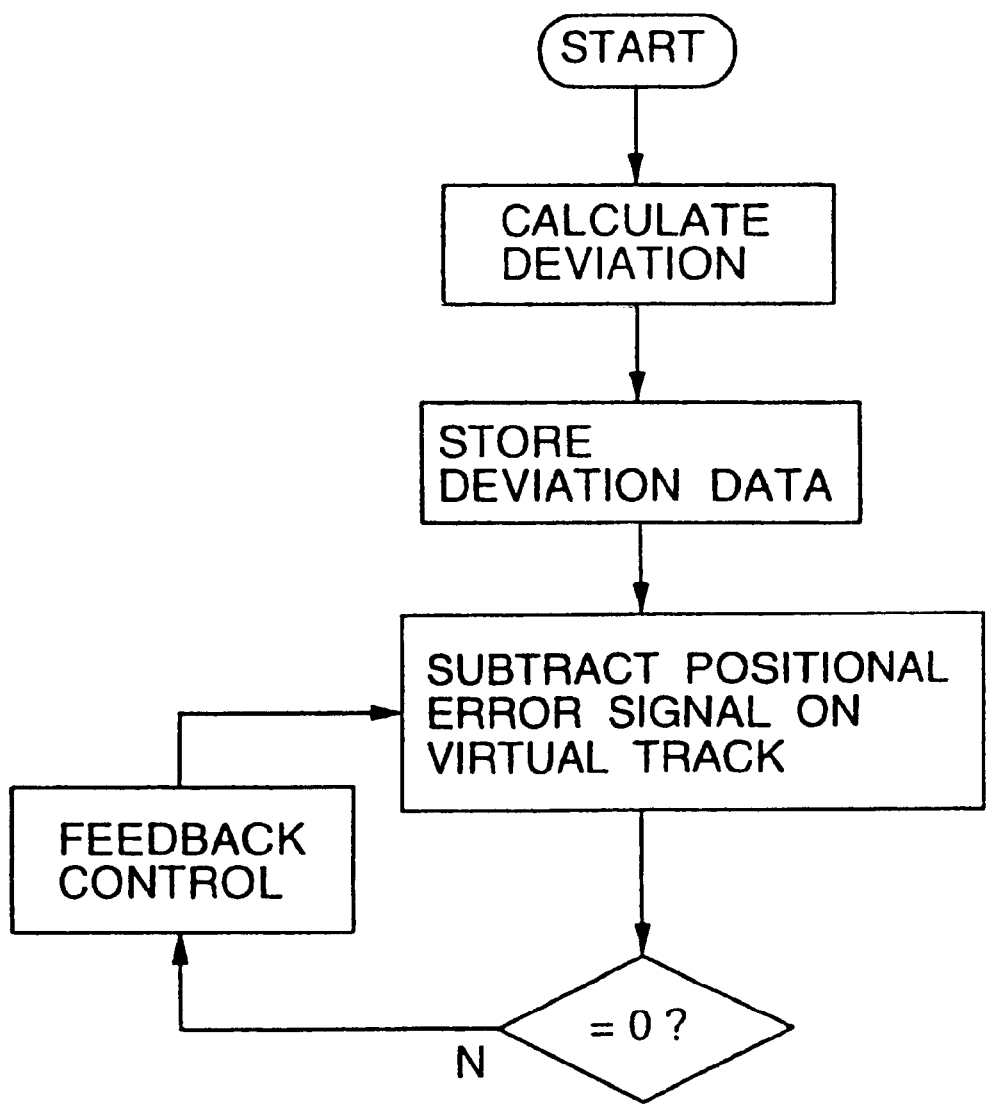
FIG. 5 is a flowchart for the operations from the generation of virtual tracks to the tracking of the head on the virtual tracks in the embodiment 1 of the magnetic recording medium according to the invention.

FIG. 5 is a flowchart for the operations from the generation of virtual tracks and the virtual track tracing of the head according to the invention. First, the deviation is measured after the disk is loaded, and the deviation data is stored in the memory. Actually, when information is magnetically recorded or reproduced, the head is controlled in a feedback manner so as to reduce the difference between the positional error information acquired by the head at each sector and the deviation data stored in the memory to zero, and thus located at the virtual track.

[Embodiment 2]

FIG. 6 shows embodiment 2 of the magnetic recording medium according to the invention. Here, the deviation measurement in the embodiment 1 of the magnetic recorder is replaced by the track counting referring to the reference tracks formed on the disk.

Figure 6A:
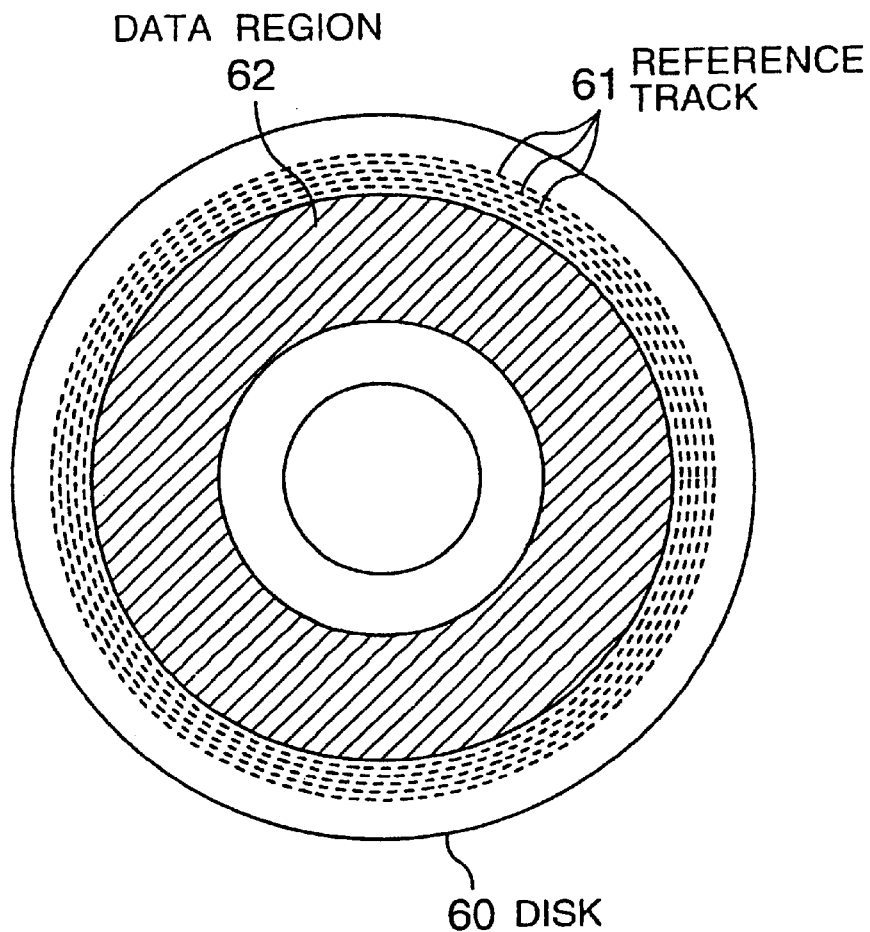
FIG. 6(a) is a plan view of main part showing the disk surface regions for the measurement of the deviation between the rotation center of the disk and the pattern center in the embodiment 2 of the magnetic recorder according to the invention.

In FIG. 6(a), a magnetic disk 60 has formed thereon a reference track region 61 where positional information is written at the same intervals as the track pitch Tp of data tracks, and a data region 62. When the center of circles of the track pattern and the rotation center of the disk are not coincident, the reference track pattern is reproduced with the head being fixed, and the positional error information is demodulated, thereby producing a signal shown in, for example, FIG. 6(b). The deviation can be obtained by counting points 64 at which this signal wave intersects a certain threshold 63.

The operations after determining the deviation are the same as in the embodiment 1 of the magnetic recorder of the invention, and thus will not be described.

[Embodiment 3]

Figure 7:
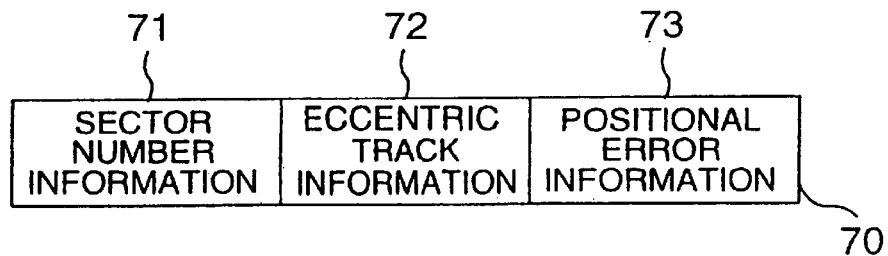
FIG. 7 shows data format of servo information in the embodiment 3 of the magnetic recording medium according to the invention.
Figure 8:
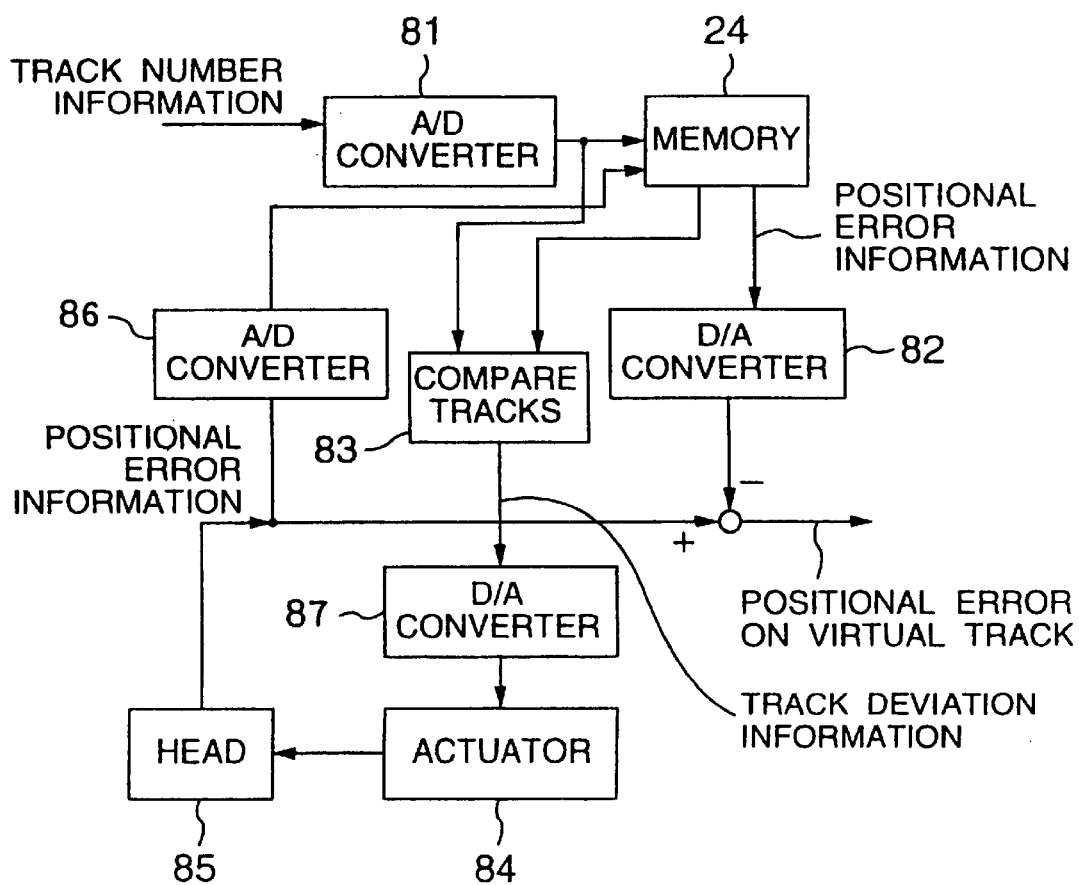
FIG. 8 is a circuit block diagram for generating virtual tracks and producing a positional error signal for tracking in the embodiment 3 of the magnetic recorder according to the invention.

FIGS. 7 and 8 show diagrams for the embodiment 3 of the magnetic recorder according to the invention.

The embodiment 3 of the recorder does not employ the deviation data in the embodiment 1, but utilizes the track number and a positional error signal within the range of track width.

FIG. 7 shows the data format of the deviation data to be stored in the memory 24 illustrated in FIG. 2(b). The deviation data 70 is formed of a sector number 71 of 9 bits, eccentric track number 72 of 16 bits, and positional error information 73 of 4 bits. Here, the positional error information 73 is produced through the processes in which the positional error signal used in the prior art within the range of track width is 2^4 divided and converted into an analog form from the digital value.

FIG. 8 is a circuit block diagram for generating virtual tracks and producing the positional error signal for tracking. First, the analog positional error information acquired from the servo pattern and the track number information for each sector are stored in the memory 24. The track number of the virtual track acquired by the head is compared with the track number stored in the memory 24, so that seek operation is performed for a predetermined track. Then, feed back control is made on the head position so as to reduce the difference between the analog positional error signal on the virtual track acquired by the head and that stored in the memory 24 to zero.

In the above embodiments 1 to 3, the deviation information or the servo information on virtual tracks may be stored in a memory such as semiconductor RAM or EEPROM. Also, it may be stored in a disk itself. In this case, a semiconductor memory for positioning is particularly not necessary.

[Embodiment 4]

Figure 9:
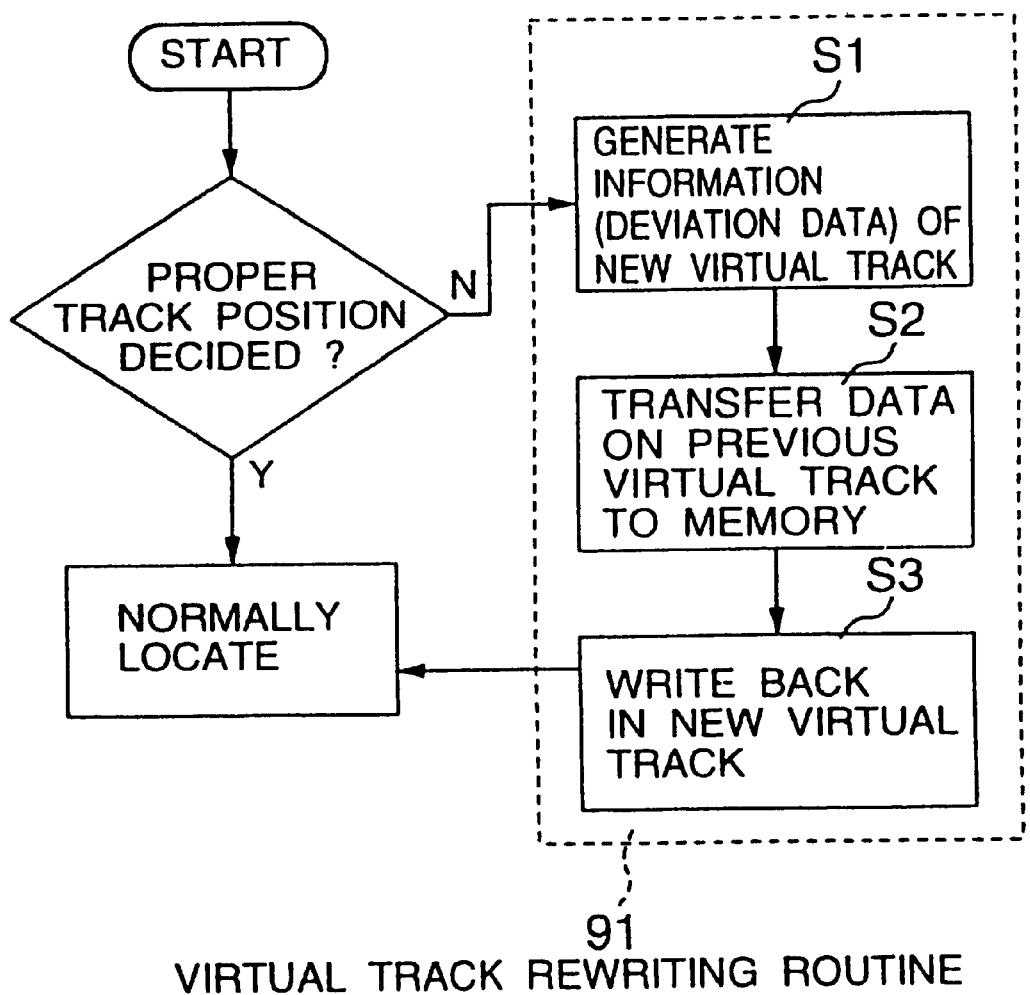
FIG. 9 is a flowchart for repairing the virtual tracks when the rotation center of the disk is shifted in the embodiment 4 of the magnetic recorder according to the invention.

FIG. 9 shows the embodiment 4 of the magnetic recording medium according to the invention. By utilizing the methods described in the above embodiments, it is possible to repair the virtual tracks even though the first disk rotation center is deviated due to the fall of the apparatus or the like. FIG. 9 is a flowchart for this purpose.

First, when the apparatus is powered, decision is made of whether the head traces a proper virtual track or not. Here, the proper virtual track is the track at which the head does not vibrate on the absolute coordinates as shown in FIG. 1(b).

Figure 6B:
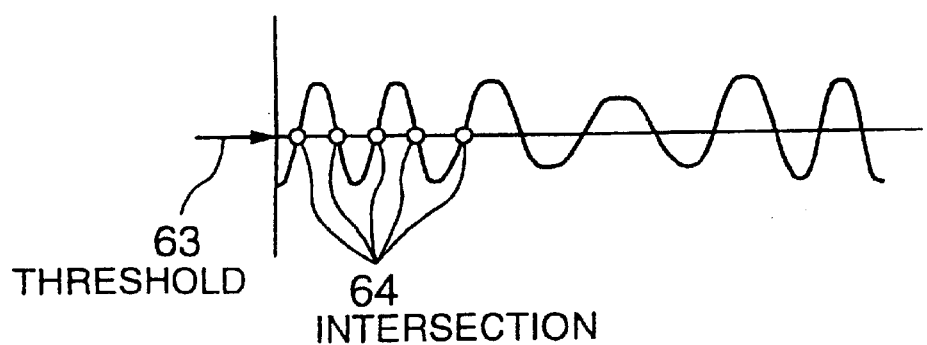
FIG. 6(b) is a graph schematically showing the reproduced waveform from a reference track.

For this decision, it is possible to reproduce the reference track pattern shown in FIG. 6(b), measure the deviation, and compare it with the deviation produced when the proper virtual track is traced.

Another method for this decision is that when the head is located at a certain virtual track, it is examined if the current flowing in the voice coil motor is a threshold or above.

In this method, if the virtual track is necessary to be repaired, the virtual track is rewritten according to an virtual track rewriting routine 91. First, the deviation data for a new virtual track is generated by the method described in the embodiments 1 to 3, and stored in the memory (S1). Here, the memory is a semiconductor memory or a continuously free region of a magnetic disk. Then, the data information on the previous virtual track is transferred to the memory (S2). Finally, the data information is written back in the new virtual track on the basis of the deviation data on the new virtual track (S3). When the amount of data is larger than the memory capacity, the entire surface of the disk is divided into several zones, and the virtual track rewriting routine 91 is repeatedly executed because all data cannot be rewritten at a time.

[Embodiment 5]

Figure 10:
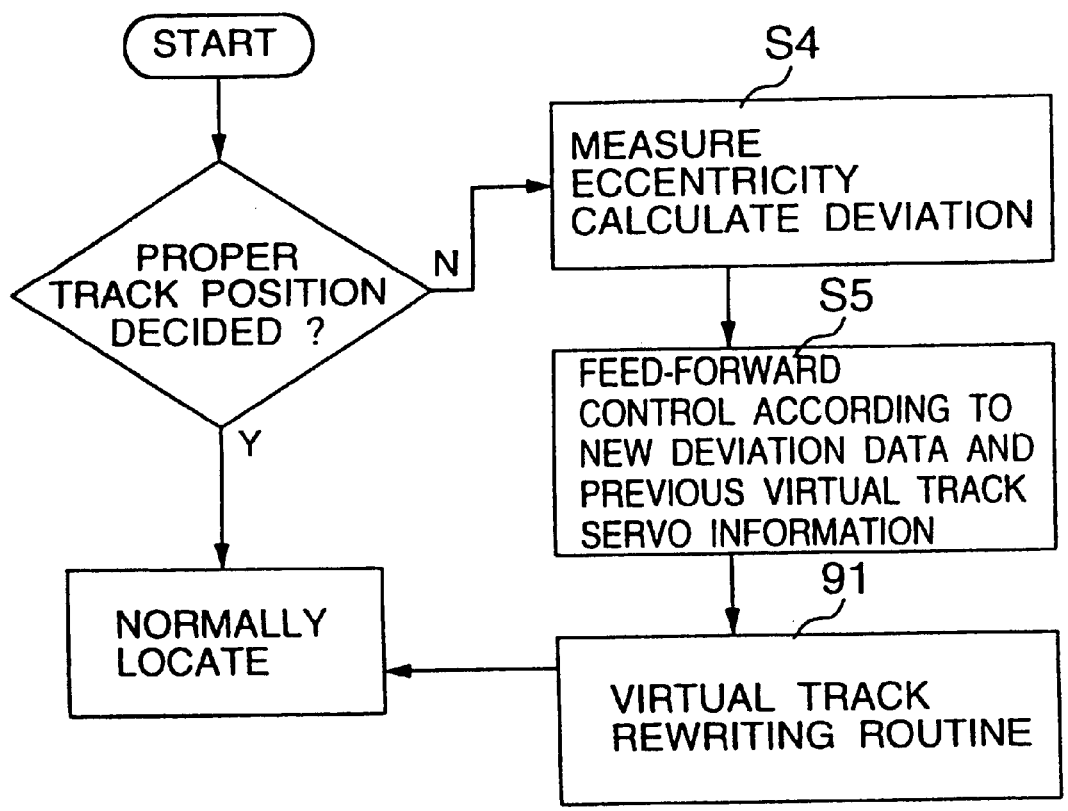
FIG. 10 is a flowchart for repairing the virtual tracks when the rotation center of the disk is shifted in the embodiment 5 of the magnetic recorder according to the invention.

FIG. 10 is a flowchart for the embodiment 5 of the magnetic recording medium according to the invention. In the embodiment 4, the rotation center of the disk is sometimes deviated too much for the disk to follow the tracks. In this case, the virtual tracks are repaired as follows.

First, as in the embodiment 4, decision is made of whether the head traces a proper virtual track when the apparatus is powered. Here, the proper virtual track is the track at which the head does not vibrate on the absolute coordinates as shown in FIG. 1(b).

If it is decided that the virtual track is necessary to be repaired, and that the head cannot follow the virtual track itself, the deviation is calculated by the same method mentioned in the embodiment 1 (S4). Then, feed-forward control is made on the basis of the servo information acquired from the sum of the calculated deviation data and the servo information of the previous virtual track (S5). At this stage, since the head can follow the previous virtual track, the virtual track is repaired according to the virtual track rewriting routine 91 described in the embodiment 4.

[Embodiment 6]

In a magnetooptical recorder, the disk is a magnetooptical recording medium, the head is an optical head, and the other elements are the same as in the magnetic recorder. Therefore, the virtual tracks are set and used in the same way as in the embodiments 1 to 3 of the magnetic recorder.

[Embodiment 7]

In a magnetooptical recorder, the disk is a magnetooptical recording medium, the head is an optical head, and the other elements are the same as in the magnetic recorder. Therefore, when the rotation center of the disk is deviated from the initial position, the virtual tracks are repaired in the same way as in the embodiments 4 and 5 of the magnetic recorder.

INDUSTRIAL APPLICABILITY

In the magnetic recorder or magnetooptical recorder of the invention, since the head need not follow faithfully the track center specified by the servo information that is previously recorded on the magnetic recording medium or magnetooptical recording medium, a vibration synchronized with rotation is not caused easily.

Therefore, when the rotation center is deviated from the pattern center, since a vibration synchronized with the rotation of the disk does not occur, the magnetic head of the magnetic recorder or the magnetooptical head of the magnetooptical recorder can follow the tracks with high precision. Thus, the invention is suited to the high-density track formation in the embedded-servo type apparatus.

What is claimed is:

1. A magnetic recorder comprising:

a magnetic recording medium having servo information and data information magnetically recorded;

a magnetic head for recording or reproducing said servo information and data information;

means for driving said magnetic recording medium to rotate around a certain point on said medium;

means for moving said magnetic head on said magnetic recording medium on the basis of said servo information;

means for determining an eccentricity between the rotation center of said magnetic recording medium and the center of concentric circular servo tracks on the basis of said servo information;

means for generating deviation data from said determined eccentricity;

means for storing said deviation data; and means for setting virtual tracks so that the rotation center of said magnetic recording medium or the vicinity thereof coincides with the track center of said data information, and making positioning servo control on the basis of said virtual tracks.

2. A magnetic recorder according to claim 1, wherein said eccentricity determining means computes said eccentricity on the basis of said servo information that are equally and discretely arranged in the rotation direction of said magnetic recording medium.

3. A magnetic recorder according to claim 1, wherein said eccentricity determining means computes said eccentricity on the basis of a special pattern arranged on part of said magnetic recording medium.

4. A magnetic recorder according to claim 1, wherein said deviation data is formed of sector information indicating the positions of sectors, positional error information indicating the center of track, and deviation information at said positions of sectors.

5. A magnetic recorder according to claim 1, wherein said deviation data storing means is a volatile semiconductor memory provided within said magnetic recorder.

6. A magnetic recorder according to claim 1, wherein said deviation data storing means is a nonvolatile semiconductor memory provided within said magnetic recorder.

7. A magnetic recorder according to claim 1, wherein said deviation data storing means is said magnetic recording medium on which said deviation data is magnetically recorded.

8. A magnetic recorder according to claim 1, wherein the center line of each of said virtual tracks is made coincident with the locus of said magnetic head by keeping a voice coil motor fixed, said voice coil motor being used as means for moving said magnetic head on the surface of said magnetic recording medium.

9. A magnetic recorder comprising:
   a magnetic recording medium having servo information and data information magnetically recorded;
   a magnetic head for recording or reproducing said servo information data information;
   means for driving said magnetic recording medium to rotate around a certain point on said medium;
   means for moving said magnetic head on said magnetic recording medium on the basis of said servo information;
   means for generating on the basis of said servo information track deviation data that is formed of sector information indicating the positions of sectors, positional error information indicating the center of track, and eccentric track number information indicating the positions of tracks;
   means for storing said deviation data; and
   means for setting virtual tracks so that the rotation center of said magnetic recording medium or the vicinity thereof coincides with the center of tracks of said data information on the basis of said stored information, and making positioning servo control on the basis of said virtual tracks.

10. A magnetic recorder according to claim 9, wherein said deviation data storing means is a volatile semiconductor memory provided within said magnetic recorder.

11. A magnetic recorder according to claim 9, wherein said deviation data storing means is a nonvolatile semiconductor memory provided within said magnetic recorder.

12. A magnetic recorder according to claim 9, wherein said deviation data storing means is said magnetic recording medium on which said deviation data is magnetically recorded.

13. A magnetic recorder according to claim 9, wherein the center line of each of said virtual tracks is made coincident with the locus of said magnetic head by keeping a voice coil motor fixed, said voice coil motor being used as means for moving said magnetic head on the surface of said magnetic recording medium.

14. A magnetic recorder comprising:
   a magnetic recording medium having servo information and data information magnetically recorded;
   a magnetic head for recording or reproducing said servo information and data information;
   means for driving said magnetic recording medium to rotate around a certain point on said medium;
   means for moving said magnetic head on said magnetic recording medium on the basis of said servo information;
   means for determining an eccentricity between the rotation center of said magnetic recording medium and the center of concentric circular servo tracks on the basis of said servo information;
   means for generating deviation data from said determined eccentricity;
   means for storing said deviation data; and
   means for setting virtual tracks so that the rotation center of said magnetic recording medium or the vicinity thereof coincides with the track center of said data information, and making positioning servo control on the basis of said virtual tracks, and when the rotation center of said magnetic recording medium is shifted after said virtual tracks are set, new virtual tracks are set and said positioning servo control is performed.

15. A magnetic recorder according to claim 14, wherein when said rotation center is shifted, said data information is transferred to a continuous free region on said magnetic recording medium, and then new virtual tracks are set.

16. A magnetic recorder according to claim 14, wherein when said rotation center is shifted, said data information is transferred to a semiconductor memory provided within said magnetic recorder, and then new virtual tracks are set, followed by the writing back of said data information.

17. A magnetic recorder, comprising:
   a magnetic recording medium having servo information and data information magnetically recorded;
   a magnetic head for recording or reproducing said servo information and data information;
   means for driving said magnetic recording medium to rotate around a certain point on said medium;
   means for moving said magnetic head on said magnetic recording medium on the basis of said servo information;
   means for determining an eccentricity between the rotation center of said magnetic recording medium and the center of concentric circular servo tracks on the basis of said servo information;
   means for generating deviation data from said determined eccentricity;
   means for storing said deviation data;
   means for setting virtual tracks so that the rotation center of said magnetic recording medium or the vicinity thereof coincides with the track center of said data information, and making positioning servo control on the basis of said virtual tracks, and when the rotation center of said magnetic recording medium is shifted after said virtual tracks are set, for setting new virtual tracks; and
   means for transferring track data information stored on said virtual tracks before said rotation center is shifted to a continuous free region on said magnetic recording medium or to a semiconductor memory provided within said magnetic recorder, and after said new virtual tracks are set, transferring said track data information to said new virtual tracks from said continuous free region or said semiconductor memory.

* * * * *